United States Patent
Gerhart

(10) Patent No.: US 8,527,170 B2
(45) Date of Patent: Sep. 3, 2013

(54) METHOD FOR OPERATING A DOUBLE CLUTCH

(71) Applicant: Schaeffler Technologies AG & Co. KG, Herzogenaurach (DE)

(72) Inventor: Juergen Gerhart, Appenweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/626,281

(22) Filed: Sep. 25, 2012

(65) Prior Publication Data

US 2013/0024081 A1 Jan. 24, 2013

Related U.S. Application Data

(63) Continuation of application No. PCT/DE2011/000299, filed on Mar. 21, 2011.

(30) Foreign Application Priority Data

| Apr. 1, 2010 | (DE) | .......................... 10 2010 013 789 |
| Jun. 28, 2010 | (DE) | .......................... 10 2010 025 339 |

(51) Int. Cl.
*G06F 17/00* (2006.01)

(52) U.S. Cl.
USPC ............ 701/67; 701/29.1; 701/51; 701/58; 477/114; 477/107; 475/129; 475/130; 74/89.23; 74/335; 74/625; 192/3.56; 192/48.1; 192/48.6; 192/48.601; 180/65.25; 180/65.27; 903/916; 903/946

(58) Field of Classification Search
USPC ............ 701/51, 58, 67; 192/3.56, 48.1, 192/84.6, 48.601, 70.252, 111.19; 74/335, 74/625; 477/107; 180/65.25, 65.27; 903/916, 903/946
See application file for complete search history.

(56) References Cited

U.S. PATENT DOCUMENTS

| 7,351,175 | B2 * | 4/2008 | Kraxner et al. ................ 475/127 |
| 7,526,919 | B2 * | 5/2009 | Dreher et al. ................... 60/437 |
| 7,703,348 | B2 * | 4/2010 | Reisch et al. .............. 74/473.11 |
| 7,966,116 | B2 | 6/2011 | Priller et al. |
| 8,055,402 | B2 | 11/2011 | Seufert et al. |
| 8,249,787 | B2 * | 8/2012 | Gierer et al. .................... 701/62 |
| 8,392,080 | B2 * | 3/2013 | Gierer et al. .................... 701/62 |
| 2007/0080004 | A1 | 4/2007 | Pfund |
| 2009/0299590 | A1 | 12/2009 | Nedachi et al. |

FOREIGN PATENT DOCUMENTS

| DE | 19936886 | 3/2001 |
| DE | 102005057844 | 6/2006 |
| DE | 102008045627 | 3/2009 |
| DE | 102007051064 | 4/2009 |

* cited by examiner

*Primary Examiner* — James Trammell
*Assistant Examiner* — McDieunel Marc
(74) *Attorney, Agent, or Firm* — Simpson & Simpson, PLLC

(57) ABSTRACT

A method of operating a double clutch that is actuated by a hydrostatic actuating system having two clutch actuators assigned to two individual clutches and each clutch actuator including a pressure sensor for sensing the operating pressure of the respective clutch actuator, the method having the step of limiting a total actuating force of the double clutch in the event of a fault using the pressure values sensed by the pressure sensors.

11 Claims, 1 Drawing Sheet

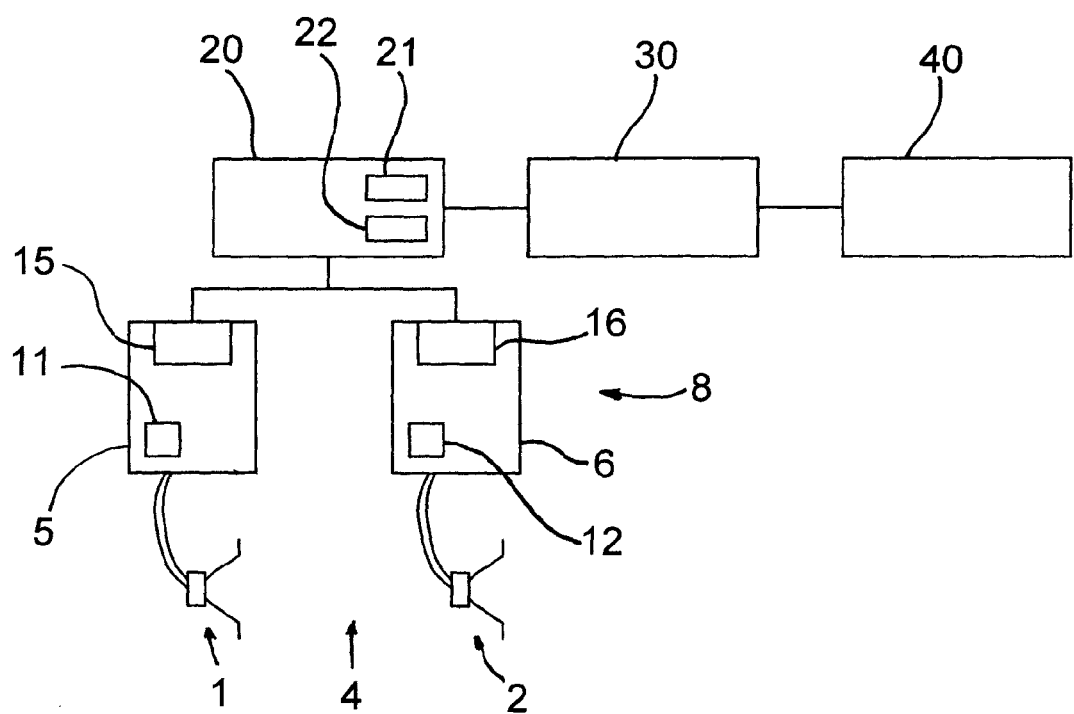

METHOD FOR OPERATING A DOUBLE CLUTCH

CROSS-REFERENCE TO RELATED APPLICATIONS

This application is filed under 35 U.S.C. §120 and §365(c) as a continuation of International Patent Application No. PCT/DE2011/000299 filed Mar. 21, 2011, which application claims priority from German Patent Application No. 10 2010 013 789.8, filed Apr. 1, 2010, and German Patent Application No. 10 2010 025 339.1, filed on Jun. 28, 2010, which applications are incorporated herein by reference in their entirety.

FIELD OF THE INVENTION

The invention relates to a method for operating a double clutch that is actuated by a hydrostatic actuating system that includes two clutch actuators assigned to two individual clutches and each having a pressure sensor that senses the working pressures of the respective clutch actuator.

BACKGROUND OF THE INVENTION

Published German Patent Application No. 10 2005 057 844 A1 discloses a method for limiting the pressure in a hydrostatic clutch release system having an automated clutch actuation. The method deliberately does this without pressure sensors or pressure relief valves, instead relying on characteristic parameters of the clutch release system to detect the clutch torque when the operating pressure in the hydrostatic release system rises beyond a maximum pressure that might cause damage to components.

BRIEF SUMMARY OF THE INVENTION

An object of the invention is to improve the reliability in operation of a double clutch that is actuated by a hydraulic actuating system.

In a method for operating a double clutch that is actuated by a hydrostatic actuating system that includes two clutch actuators assigned to two individual clutches and each having a respective pressure sensor for detecting the operating pressure of the respective clutch actuator, this object is attained by limiting a total actuating force of the double clutch when a fault occurs with the aid of the pressure values sensed by the pressure sensors. The total actuating force is defined as the total of the actuating forces of the two individual clutches. In double clutches, some components are exposed to the total actuating force. The double clutch is preferably a directly actuated clutch. In such a clutch, an apply bearing, a clutch cover and components connecting the clutch cover with a central plate, for example, are exposed to the total actuating force. When the two individual clutches are actuated simultaneously, the total actuating force may be higher than the maximum actuating force of an individual clutch. During normal operation, this phenomenon may occur, for instance, during an overlapping shifting operation. In such a case, for example, forces amounting to up to 120% of the maximum actuating force of an individual clutch may occur. Due to the limiting of the total actuating force in accordance with the invention, the amount of stress on the components of the double clutch during normal operation is reduced. Consequently, the components need not be as strong and can be manufactured at lower cost. In addition, there may be driving situations in which greater total actuating forces occur than during normal operation. If, for instance, in the event of a fault, one of the individual clutches does not open anymore because of a defect, the maximum acceptable total actuating force might be exceeded. The hydrostatic actuating system may preferably be a hydrostatic engagement system of an automated double clutch. Thus, the total actuating force is preferably a total engagement force resulting from the total of the engagement forces of the two individual clutches. The engagement of the clutch refers to the closing of the clutch in order for a torque to be transmitted.

In one embodiment of the method, when a fault occurs, the total actuating force is limited in such a way that the double clutch can be operated with only one individual clutch without the other individual clutch. Thus, on the one hand, damage to components of the double clutch that are exposed to the total actuating force is avoided; on the other hand, in accordance with a further aspect of the invention, what is referred to as a limp-home function is made possible in which only one individual clutch is actuated.

In another embodiment of the method, when a superordinate control detects a fault in one of the individual clutches, one of the clutch actuators, or in the hydrostatic actuating system, a gear engaged in the relevant individual clutch is disengaged. The superordinate control is preferably a transmission control. Once the corresponding gear has been disengaged, operation may continue with the non-affected individual clutch. In the process, the actuating force, for example, the engaging force, of the individual non-affected clutch is limited to ensure that no unacceptably high total actuating force, for example, no unacceptably high total engaging force occurs in the limp-home operation.

In yet another embodiment of the method, the operating pressure of the affected individual clutch is detected at a switch-off instant or prior to the disengaging of the engaged gear, and the detected pressure value is stored in a memory of the superordinate control. The memory may, for instance, be a RAM (Random Access Memory) taking the form of a memory chip that allows quick access but only saves the data temporarily. In accordance with a further aspect of the invention, when the superordinate control device is shut down, for instance, after the ignition has been switched off, the detected and stored pressure value is thus stored in a non-volatile memory, for instance, an EEPROM (Electrically Erasable and Programmable Read Only Memory).

In another embodiment of the method, a pressure increase potentially occurring after the switch-off instant is detected and factored in the stored pressure value. When a fault occurs in one of the individual clutches, the clutch in question is switched off and the operating pressure at the switch-off instant is detected and stored. If the affected individual clutch was just being actuated when the fault occurred, the individual clutch may continue to move slightly once it has been switched off, thus causing the operating pressure to continue to increase slightly. This additional pressure increase, which would not be measured in this case, is calculated mathematically, for instance using a simple model of the actuating system, for example, of the engagement system, and factored in.

In yet another embodiment of the method, with the aid of the stored pressure value, an actuating force that the hydrostatic actuating system applies to the affected individual clutch is calculated. At the same time, the operating pressure of the non-affected clutch is detected.

In another embodiment of the invention, the total actuating force of the double clutch is calculated from the calculated actuating force of the affected individual clutch and the operating pressure of the non-affected individual clutch. This may be done, for example, in the superordinate control.

In yet another embodiment of the method, the operating pressure of the non-affected individual clutch is limited to an acceptable value of the total actuating force. Once the defect of the affected clutch has been detected, the engaged gear of the corresponding range of gears is disengaged, for instance, by the superordinate control. Then, the vehicle that is equipped with the double clutch may continue to be operated using the non-affected clutch.

In another embodiment of the method, the method includes the step of calculating a maximum acceptable clutch torque, which causes the maximum acceptable total actuating force to be reached. In the process, the fact is taken into consideration that a clutch torque that may potentially be reached during normal operation can no longer be reached with the non-affected individual clutch.

In yet another embodiment of the method, the maximum acceptable clutch torque is forwarded to an engine control, which limits an engine torque to the maximum acceptable clutch torque. As a result, for example undesired slipping of the non-affected individual clutch caused by too high an engine torque can be avoided. On the one hand, this is done to protect the non-affected individual clutch; and on the other hand it is done to allow a smooth limp-home operation.

BRIEF DESCRIPTION OF THE DRAWINGS

The nature and mode of operation of the present invention will now be more fully described in the following detailed description of the invention taken with the accompanying drawing FIGURE, in which:

FIG. 1 is a diagrammatical representation of a double clutch that can be operated in accordance with the method of the invention.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1 is a greatly simplified representation of a double clutch 4 having two individual clutches 1, 2. Two individual clutches 1, 2 are actuated by hydrostatic actuators 5, 6 of hydrostatic actuating system 8. Each of actuators 5, 6 of individual clutches 1, 2 is assigned pressure sensor 11, 12 that senses the operating pressure of the respective clutch actuator during operation of double clutch 4.

In addition to the pressure sensors 11, 12, each of the actuators 5, 6 comprises actuating electronics 15, 16. A superordinate transmission control 20 controls the actuators 5, 6 by way of the actuating electronics 15, 16. The transmission control 20 comprises a volatile memory 21 such as a RAM, and a non-volatile memory 22 such as an EEPROM.

For controlling purposes, transmission control 20 is connected to an engine control 30, which controls combustion engine 40 of a motor vehicle. In the event of a fault on one of individual clutches 1, 2, the engaging force of the defective individual clutch is calculated from the pressure signal of pressure sensor 11, 12 of affected individual clutch 1, 2 as follows:

$F\_engage\_def\_clutch = (p\_def\_clutch + p\_dynamic) *$
$A\_slave\_def\_clutch - F\_friction$, with $F\_engage\_def\_clutch$: calculated engaging force of the defective clutch;
$p\_def\_clutch$: stored pressure of the defective clutch at the switch-off instant;
$p\_dynamic$: pressure increase due to potential self-dynamics in the engagement system after the defective clutch has been switched off;
$A\_slave\_def\_clutch$: effective surface of the slave piston of the defective clutch;
$F\_friction$: frictions of the defective clutch including slave friction.

The stored pressure of the defective individual clutch is stored in volatile memory 21 and, in the event of a shut-down of transmission control 20, in non-volatile memory 22.

A maximum acceptable clutch torque is calculated as follows:
$M\_clutch\_max = (F\_total\_max - F\_engage\_def\_clutch) *$ clutch friction coefficient, with
$M\_clutch\_max$: the maximum acceptable clutch torque of the defective clutch in the non-defective state;
$F\_total\_max$: the maximum acceptable total engaging force;
Clutch friction coefficient: the current friction coefficient of the clutch in the non-defective state. This coefficient is stored in the clutch control.

The calculations are made, for example, in superordinate transmission control 20. The calculated value for the maximum clutch torque $M\_clutch\_max$ that can be set is forwarded to engine control 30 by transmission control 20. Engine control 30 then proceeds to limit the combustion engine torque to the corresponding value.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS AND DESIGNATIONS 1 individual clutch
2 individual clutch
4 double clutch
5 actuator
6 actuator
8 hydrostatic actuating system
11 pressure sensor
12 pressure sensor
15 actuating electronics
16 actuating electronics
20 transmission control
21 memory
22 memory 30 engine control
40 combustion engine

What is claimed is:

1. A method of operating a double clutch (4) that is actuated by a hydrostatic actuating system (8) that comprises two clutch actuators (5, 6) assigned to two individual clutches (1, 2) where each said actuator comprises a pressure sensor (11, 12) for sensing the operating pressure of the respective clutch actuator (5, 6), the method comprising the step of limiting a total actuating force of the double clutch (4) in the event of a fault using the pressure values sensed by the pressure sensors (11, 12).

2. The method recited in claim 1, wherein in the event of a fault, the total actuating force is limited in such a way that the double clutch (4) can be operated with only one individual clutch (1, 2) without the other individual clutch (2, 1).

3. The method recited in claim 2, wherein once a defect has been detected in one of the individual clutches (1, 2), in one of the clutch actuators (5, 6), or in the hydrostatic actuating system (8), a gear that is engaged in the affected individual clutch (1, 2) is disengaged in a superordinate control (20).

4. The method recited in claim 1, wherein once a defect has been detected in one of the individual clutches (1, 2), in one of the clutch actuators (5, 6), or in the hydrostatic actuating system (8), a gear that is engaged in the affected individual clutch (1, 2) is disengaged in a superordinate control (20).

5. The method recited in claim 4, wherein the operating pressure of the affected individual clutch (1, 2) at a switch-off instant is detected and the detected pressure value is stored in a memory (21, 22) of the superordinate control (20).

6. The method recited in claim 5, wherein a pressure increase potentially occurring after the switch-off instant is determined and taken into consideration in the stored pressure value.

7. The method recited in claim 5, wherein an actuating force that the hydrostatic actuating system (8) applies to the affected individual clutch (1, 2) is calculated with the aid of the stored pressure value.

8. The method recited in claim 7, wherein the total actuating force of the double clutch (4) is determined from the calculated actuating force of the affected individual clutch (1, 2) and the operating pressure of the non-affected individual clutch (2, 1).

9. The method recited in claim 8, wherein the operating pressure of the non-affected individual clutch (1, 2) is limited to an acceptable value of the total actuating force.

10. The method recited in claim 8, comprising the step of calculating a maximum acceptable clutch torque with which the maximum acceptable total actuating force is reached.

11. The method recited in claim 10, comprising the step of forwarding the maximum acceptable clutch torque to an engine control (30) that limits a motor torque to the maximum acceptable clutch torque.

* * * * *